US009652256B2

(12) United States Patent
Grossman et al.

(10) Patent No.: US 9,652,256 B2
(45) Date of Patent: May 16, 2017

(54) METHOD AND SYSTEM FOR PROVIDING DATA-RELATED INFORMATION AND VIDEOS TO SOFTWARE APPLICATION END-USERS

(75) Inventors: Tovi Grossman, Toronto (CA); George Fitzmaurice, Toronto (CA)

(73) Assignee: AUTODESK, Inc., San Rafael, CA (US)

( * ) Notice: Subject to any disclaimer, the term of this patent is extended or adjusted under 35 U.S.C. 154(b) by 924 days.

(21) Appl. No.: 12/911,681

(22) Filed: Oct. 25, 2010

(65) Prior Publication Data

US 2011/0099475 A1 Apr. 28, 2011

Related U.S. Application Data

(60) Provisional application No. 61/255,022, filed on Oct. 26, 2009.

(51) Int. Cl.
| | | |
|---|---|---|
| *G06F 3/048* | (2013.01) | |
| *G06F 9/44* | (2006.01) | |
| *G06F 9/455* | (2006.01) | |
| *G06F 17/30* | (2006.01) | |
| *G06K 9/20* | (2006.01) | |
| *G06K 9/32* | (2006.01) | |
| *G06K 9/00* | (2006.01) | |

(52) U.S. Cl.
CPC ............ *G06F 9/4446* (2013.01); *G06F 9/455* (2013.01); *G06F 9/45512* (2013.01); *G06F 17/30* (2013.01); *G06K 9/00402* (2013.01); *G06K 9/2054* (2013.01); *G06K 9/3233* (2013.01)

(58) Field of Classification Search
CPC .... G06F 9/4446; G06F 9/455; G06F 9/45512; G06F 17/30; G06K 9/2054; G06K 9/3233; G06K 9/00402
USPC .......................................... 715/704–705, 709
See application file for complete search history.

(56) References Cited

U.S. PATENT DOCUMENTS

| | | | |
|---|---|---|---|
| 7,458,013 B2 * | 11/2008 | Fruchter et al. ............... | 715/203 |
| 2006/0092178 A1 * | 5/2006 | Tanguay et al. ............... | 345/629 |
| 2009/0193034 A1 * | 7/2009 | Hirasaki ........... | G06F 17/30899 |
| 2010/0017693 A1 * | 1/2010 | Keohane et al. ............. | 715/201 |
| 2010/0269041 A1 * | 10/2010 | Kintzley ............. | G06F 9/45512 |
| | | | 715/704 |
| 2013/0120439 A1 * | 5/2013 | Harris et al. .................. | 345/619 |

* cited by examiner

*Primary Examiner* — Amy Ng
*Assistant Examiner* — Sajeda Muhebbullah
(74) *Attorney, Agent, or Firm* — Artegis Law Group, LLP (57) ABSTRACT

A user operations engine allows an end-user to select a specific region of a document. The user operations engine then provides the end-user with access to one or more video clips that demonstrate modifications that were made to the selected region of the document using one or more tools associated with a software application.

18 Claims, 11 Drawing Sheets

METHOD AND SYSTEM FOR PROVIDING DATA-RELATED INFORMATION AND VIDEOS TO SOFTWARE APPLICATION END-USERS

CROSS-REFERENCE TO RELATED APPLICATIONS

This application claims benefit of U.S. provisional patent application Ser. No. 61/255,022, filed on Oct. 26, 2009, which is hereby incorporated herein by reference.

BACKGROUND OF THE INVENTION

Field of the Invention

The present invention generally relates to software usage and, more specifically, to a method and system for providing data-related information and videos to software application end-users.

Description of the Related Art

Software applications—such as word processors, image renderers, and internet browsers—enable individuals to execute different productivity-based tasks, including writing documents, interacting with digital photos, and sending electronic mail. Typically, each application makes available a set of tools that enable a user to perform specific functions within the application. For example, a conventional computer-aided design (CAD) application allows an end-user to generate CAD drawings using various tools associated with the CAD application. The CAD application may also provide the end-user with access to examples of CAD drawings that demonstrate the effects of using the various tools on data. One drawback of this approach is that the exemplary CAD drawings often provide insufficient detail regarding use of the tools. Consequently, despite having viewed the exemplary CAD drawings, the end-user may still have difficulty understanding how those tools are used.

As the foregoing illustrates, there is a need in the art for a more effective way to provide end-users of an application with instructional information related to the application.

SUMMARY OF THE INVENTION

Embodiments of the invention include a computer-implemented method for providing data-related instructional information to an end-user of a software application executing on a computing device. The method includes receiving a selection of a first region of application data associated with the software application on the computing device, accessing instructional information indicating how to use one or more techniques and/or tools previously used to modify the first region, and displaying the instructional information to the end-user via a display associated with the computing device.

Advantageously, the end-user of the software application is provided with instructional information that specifies a precise sequence of operations that can be implemented to generate a particular feature of application data associated with the software application.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
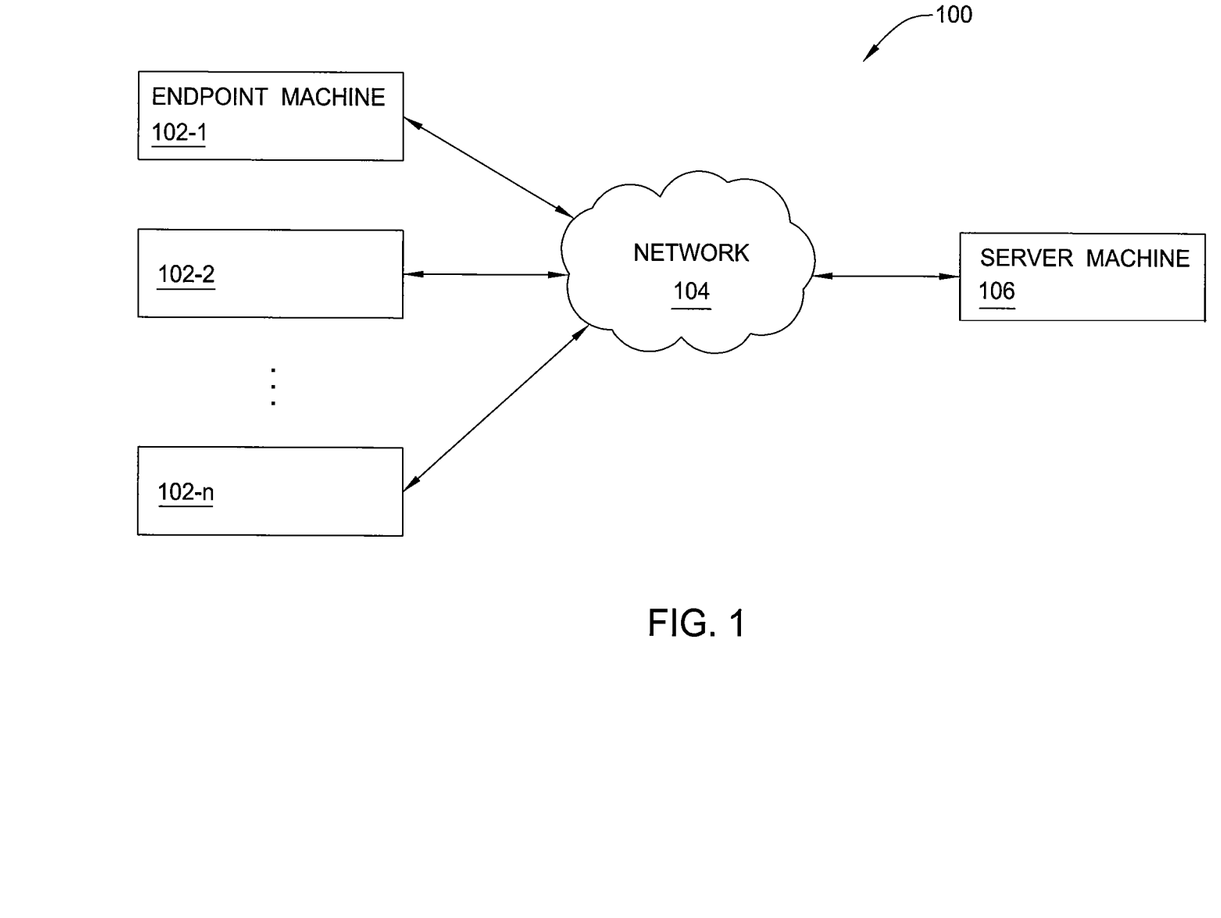
FIG. 1 illustrates a computer system configured to implement one or more aspects of the present invention.

FIG. 1 illustrates a computer system 100 configured to implement one or more aspects of the present invention. As shown, the computer system 100 includes one or more endpoint machines 102 coupled to a server machine 106 via a network 104. The endpoint machines 102 are configured to transmit data to and receive data from the server machine 106 across the network 104.

Each endpoint machine 102 executes a software application and a user operations engine. As described in greater detail in conjunction with FIG. 2, the user operations engine records commands issued by an end-user to the software application when modifying a document associated with the software application. The user operations engine then transmits data specifying the issued commands, data specifying the particular regions of the document modified by those commands, and data that reflects the changes made to the document in response to those commands, to the server machine 106. The server machine 106 is configured to accumulate this data from each of the endpoint machines 102 and to store the data in an operations database. In one embodiment, an endpoint machine 102 may be configured to provide the functionality of the server machine 106, thereby eliminating the necessity of a separate and dedicated server machine 106. The server machine 106 is configured to access the stored data in response to requests from one or more of the endpoint machines 102. The server machine 106 may then provide the data to the endpoint machines 102 that requested the data, as described in greater detail below in conjunction with FIG. 2.

Figure 2:
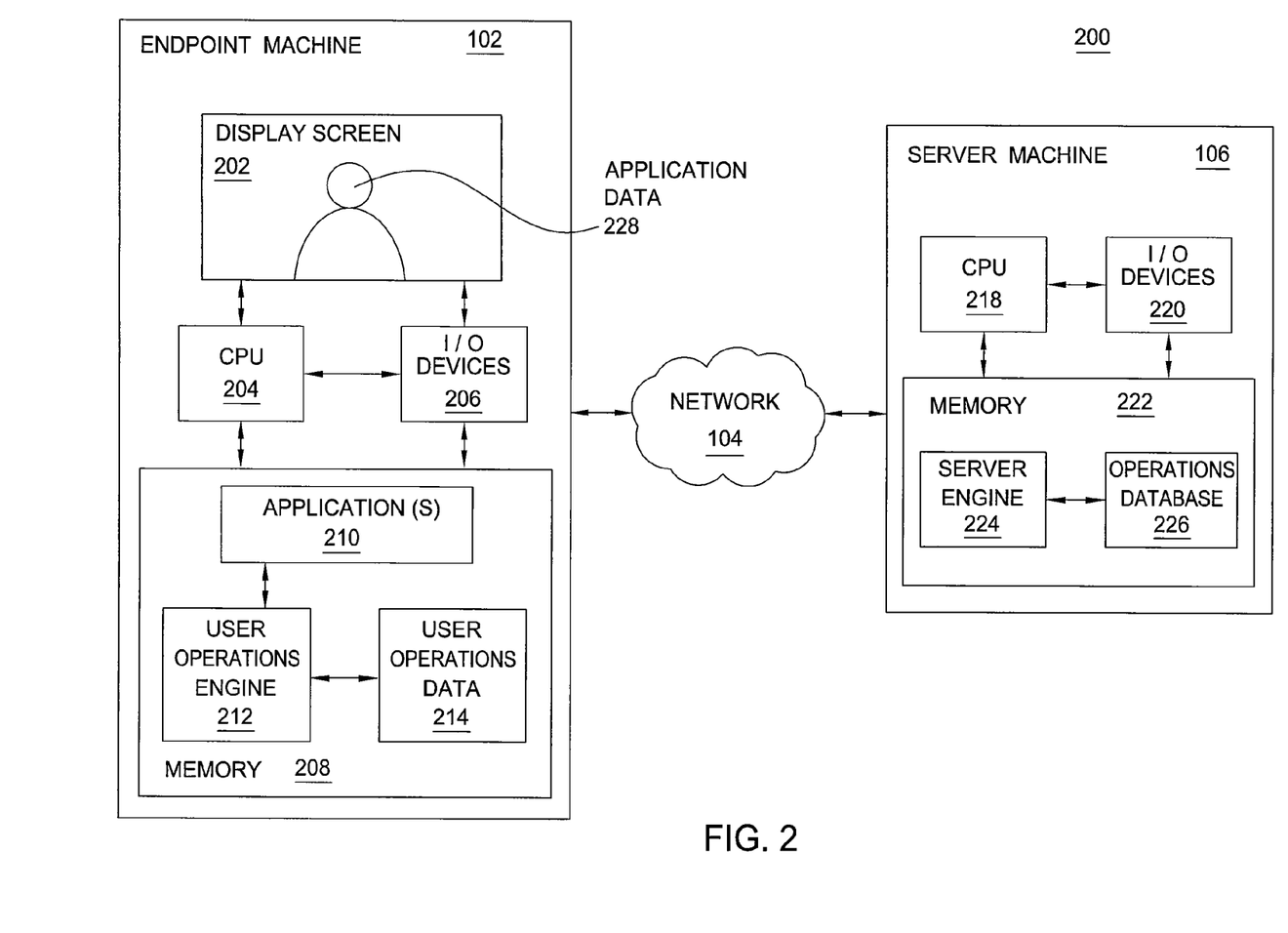
FIG. 2 illustrates a portion of the computer system of FIG. 1, according to one embodiment of the invention.

FIG. 2 illustrates a portion of the computer system 100 of FIG. 1, according to one embodiment of the invention. As shown, the endpoint machine 102 includes a display screen 202, a central processing unit (CPU) 204, one or more input/output (I/O) devices 206, and a memory 208. The memory 208 includes software application(s) 210, a user operations engine 212, and user operations data 214. The software application 210 may be any type of software application, though in the exemplary embodiment described herein, the software application 210 is a computer-aided design (CAD) application. An end-user of the software application 210 may issue commands to the software application 210 in order to modify a document associated with the software application 210.

The user operations engine 212 records the commands issued by the end-user to the software application 210, indications of the specific regions of the document modified by those commands, and data that reflects the modifications made to the document in response to those commands. The user operations engine 212 stores this information within an "operations data element." The operations data element also includes a timestamp indicating a time when the modifications where made to the application data. The user operations engine 212 may store a plurality of operations data elements in the user operations data 214, as described below in conjunction with FIGS. 3A-8.

Figure 3A:
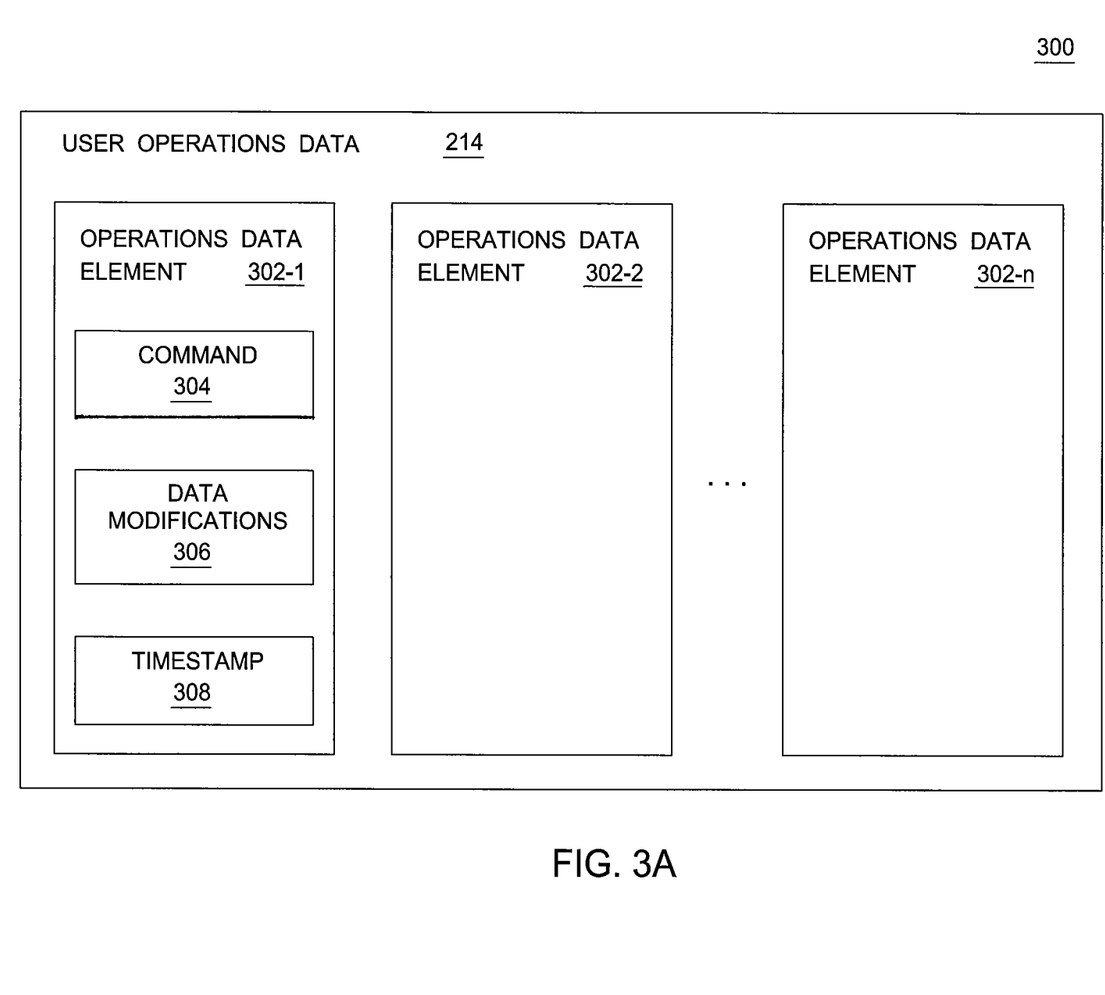
FIGS. 3A-3B illustrate user operations data stored within the computer system of FIG. 1, according to one embodiment of the invention.

FIG. 3A illustrates one embodiment of user operations data 214 stored within the computer system 100 of FIG. 1. As shown, the user operations data 214 includes operations data elements 302. Each operations data element 302 includes one or more commands 304 issued by the end-user to the software application 210, one or more data modifications 306 that occurred in response to the commands 304, and a timestamp 308 indicating the time(s) when the commands 304 were issued. Data modifications 306 reflect a specific region of a document modified by the commands 304. Instead of recording commands 304 and data modifications 306, the user operations engine 212 may simply capture a sequence of screenshots that illustrate usage of various tools to modify the specific region of the document, as described below in conjunction with FIG. 3B.

Figure 3B:
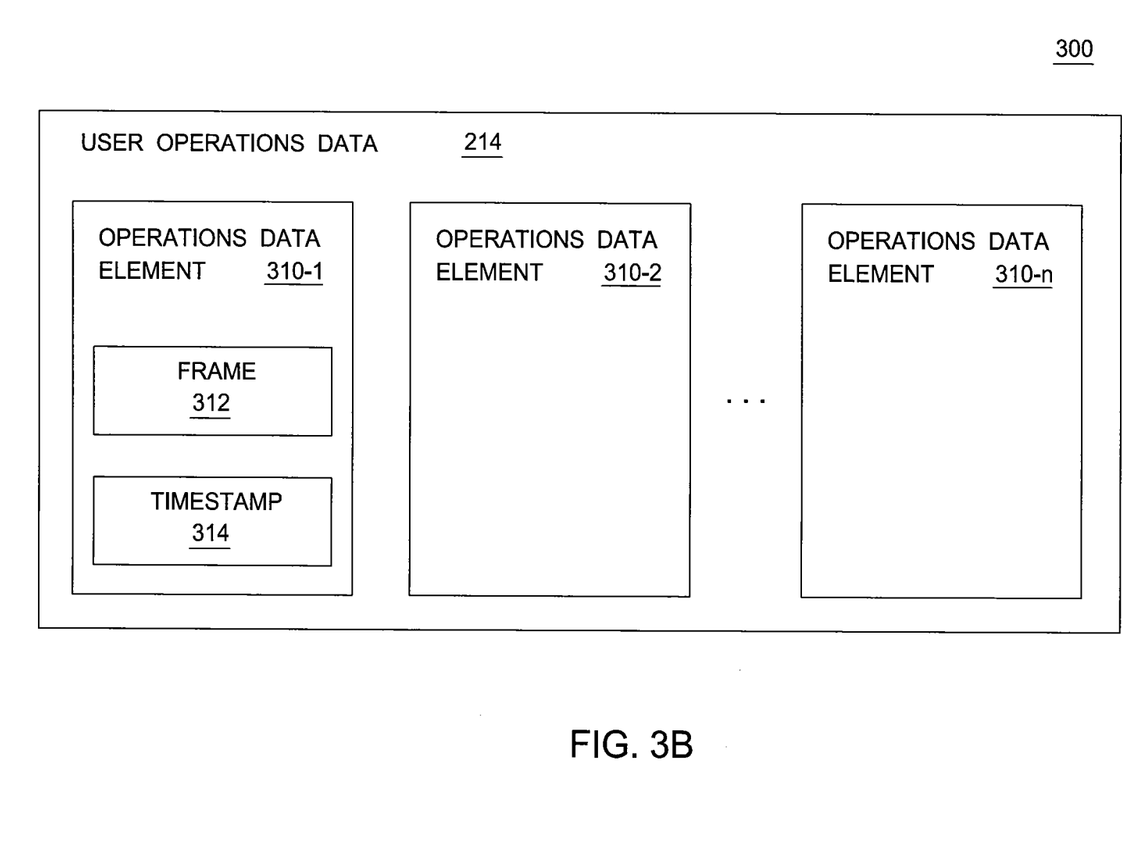

FIG. 3B illustrates another embodiment of user operations data 214 stored within the computer system 100 of FIG. 1. As shown, the user operations data 214 includes operations data elements 310. Each operations data element 310 includes a frame 312 and a timestamp 314. Each frame 312 is a screen capture taken at the time specified by the timestamp 314. By recording frames 312 in the fashion described herein, the user operations engine 212 may capture data that demonstrates usage of various tools associated with the application 210. In one embodiment, the user operations engine 212 records both frames 312, as described herein, as well as commands 304 and data modifications 306, as previously described in conjunction with FIG. 3A.

Referring back now to FIG. 2, the user operations data 214 may comprise either the user operations data shown in FIG. 3A, the user operations data shown in FIG. 3B, or both. The user operations engine 212 transmits the user operations data 214 to the server machine 216. As shown, the server machine 216 includes a CPU 218, one or more I/O devices 220, and a memory 222. A server engine 224 included in the memory 222 may receive and accumulate user operations data 214 from all of the endpoint machines 102 and store the accumulated user operations data within a user operations database 226 also included in the memory 222. Each user operations engine 212 within the endpoint machines 102 may access the accumulated user operations data across the network 104 by communicating with the server engine 224. The user operations engine 212 receives input from an end-user and, based on that input, causes the server engine 224 to retrieve instructional information from the user operations database 226 to be transmitted to the endpoint machine 102.

More specifically, the user operations engine 212 allows the end-user to select a particular region of a document associated with the software application 210. The user operations engine 212 then transmits information specifying the selected region to the server engine 224. The server engine 224 identifies within the operations database 226 an operations data element that includes information specifying changes to that particular region. The server engine retrieves 224 one or more video clips that demonstrate modifications to the selected region using one or more tools associated with the software application, as described in greater detail in conjunction with FIG. 4.

Figure 4:
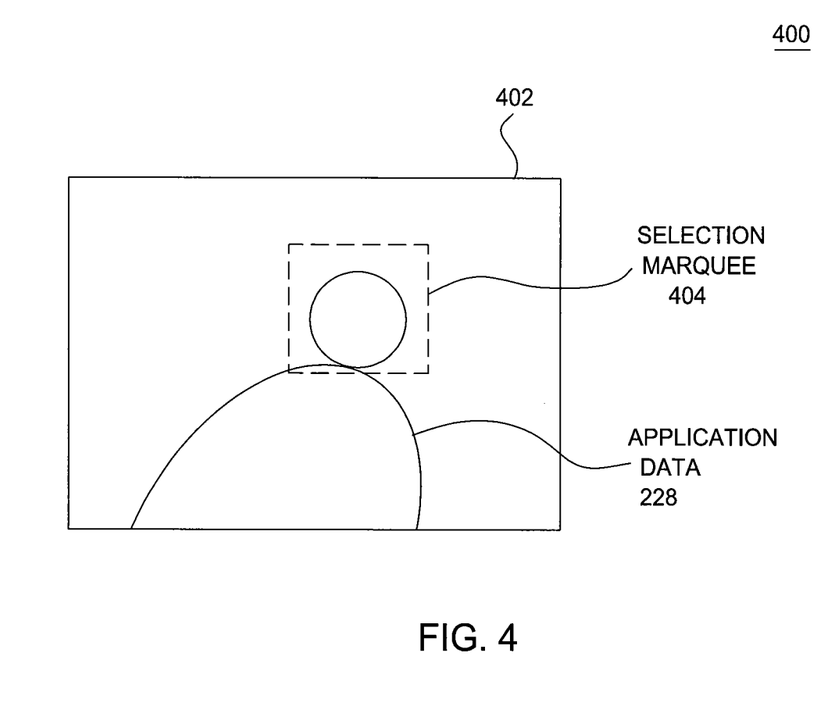
FIGS. 4, 5A-5B, and 6 each illustrate a screenshot of a graphical user interface (GUI), according to one embodiment of the invention.

FIG. 4 illustrates a screenshot 402 of a GUI, according to one embodiment of the invention. As shown, the screenshot 402 includes application data 228 and a selection marquee 404. The application data 228 represents a portion of a document associated with the application 210. An end-user selects a particular region of application data 228 using the selection marquee 404. Those skilled in the art will recognize that the selection marquee 404 represents just one exemplary embodiment, and that various embodiments of the selection marquee 404 allow the end-user to select regions of the application data 228 having any shape.

Once the end-user selects a region of the application data 228, user operations engine 212 receives the selection and transmits data indicating the selected region of application data 228 to the server engine 224. In response, the server engine 224 accesses operations data element 310 and retrieves one or more video clips that demonstrate changes made to the selected region of the application data 228 using one or more tools associated with the software application 210. The server engine 224 then transmits the video clips to the user operations engine 212. The user operation engine 212 may then display the video clips to the end-user using any of the exemplary techniques described below in conjunction with FIGS. 5A-5B.

Figure 5A:
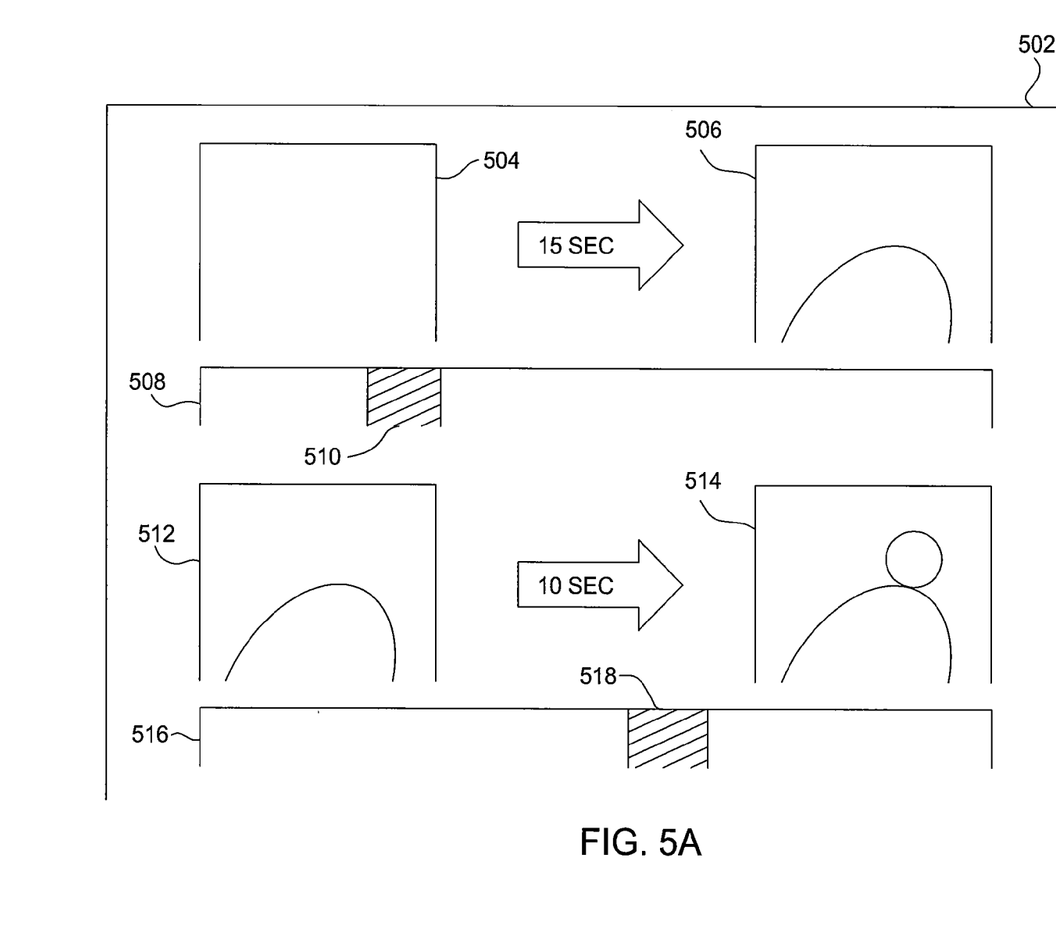

FIG. 5A illustrates a screenshot 502 of a GUI, according to one embodiment of the invention. As shown, the screen shot 502 includes thumbnail images 504, 506, 512, and 514. Thumbnail images 504 and 506 are associated with a timeline 508 that includes a marker 510. Thumbnail images 508 and 510 are associated with a timeline 516 that includes a marker 518. When an end-user generates and/or modifies application data 228 shown in FIG. 4, the user operations engine 212 may capture thumbnail images 504, 506, 512, and 514. Thumbnail images 504 and 506 illustrate a first modification to the region of application data 228 selected using the selection marquee 404. Marker 510 indicates a point in time when the first modification was made, relative to a history of modifications made to the application data 228. Thumbnail images 512 and 614 illustrate a second modification to the application data 228 selected using the selection marquee 404, and marker 516 indicates a point in time when the second modification was made, relative to the history of modifications made to the application data 228. When the end-user selects one of the thumbnail images in the screenshot 502, the user operations engine 212 may display a video clip to the end-user that demonstrates modifications made to the application data 228.

Figure 5B:
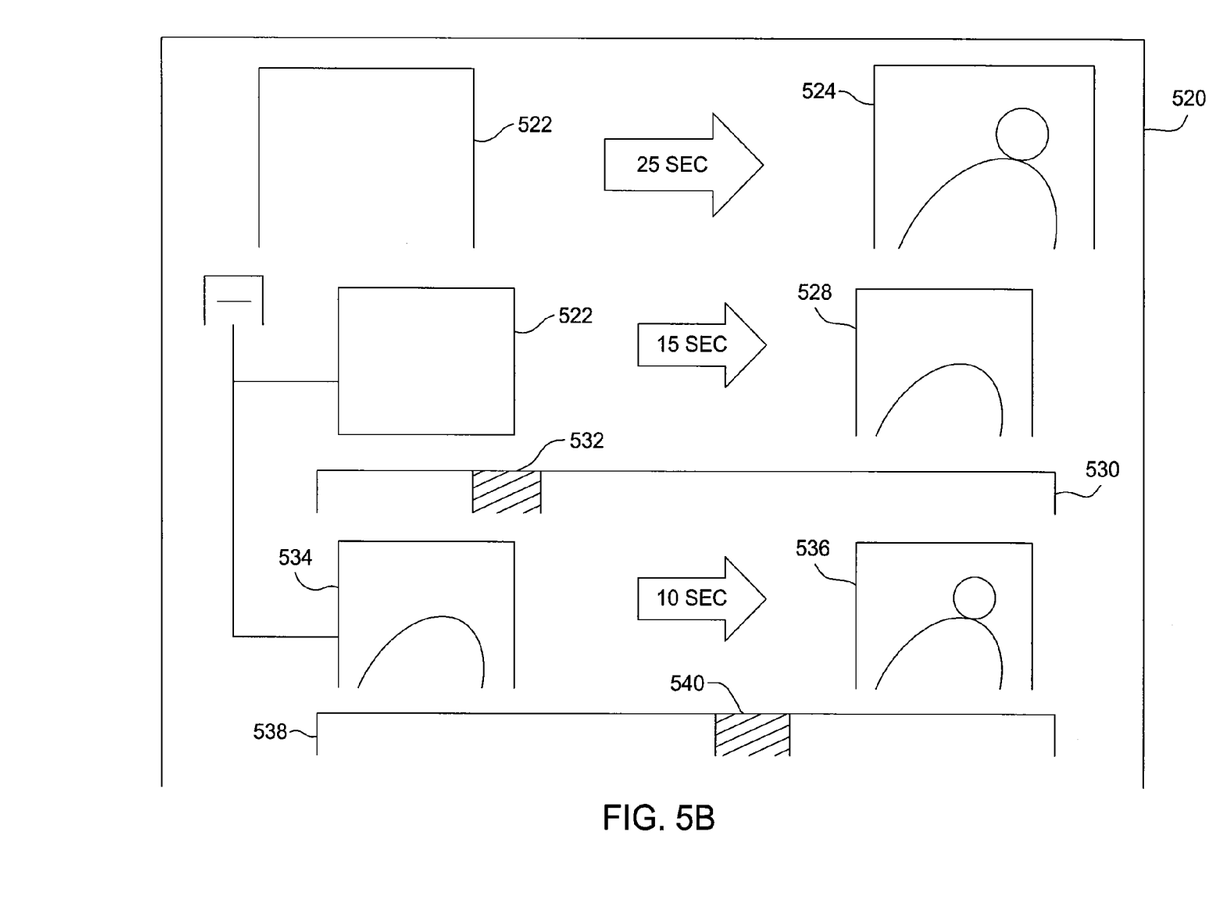

FIG. 5B illustrates a screenshot 520 of a GUI, according to one embodiment of the invention. Screenshot 520 may be displayed to the end-user following selection using the selection marquee 404 instead of screenshot 502 being displayed.

As shown, the screenshot 520 includes high-level thumbnail images 522 and 524 and low-level thumbnail images 526, 528, 534, and 536. High-level thumbnail images 522 and 524 illustrate a modification made to application data 228. Low-level thumbnail images 526 and 528 illustrate one part of the modification to application data 228 and are each associated with timeline 530 and marker 532. Low-level thumbnail images 534 and 536 illustrate another part of the modification to application data 228. Low-level thumbnail images 534 and 536 are each associated with timeline 538 and marker 540. Low-level thumbnail images 526, 528, 534, and 536 are included within a hierarchy of thumbnail images that represent the total modifications made to the application data 228. When the end-user selects one of the thumbnail images shown in the screenshot 520, the user operations engine 212 may display a video clip to the end-user that demonstrates modifications made to the application data 228.

Figure 6:
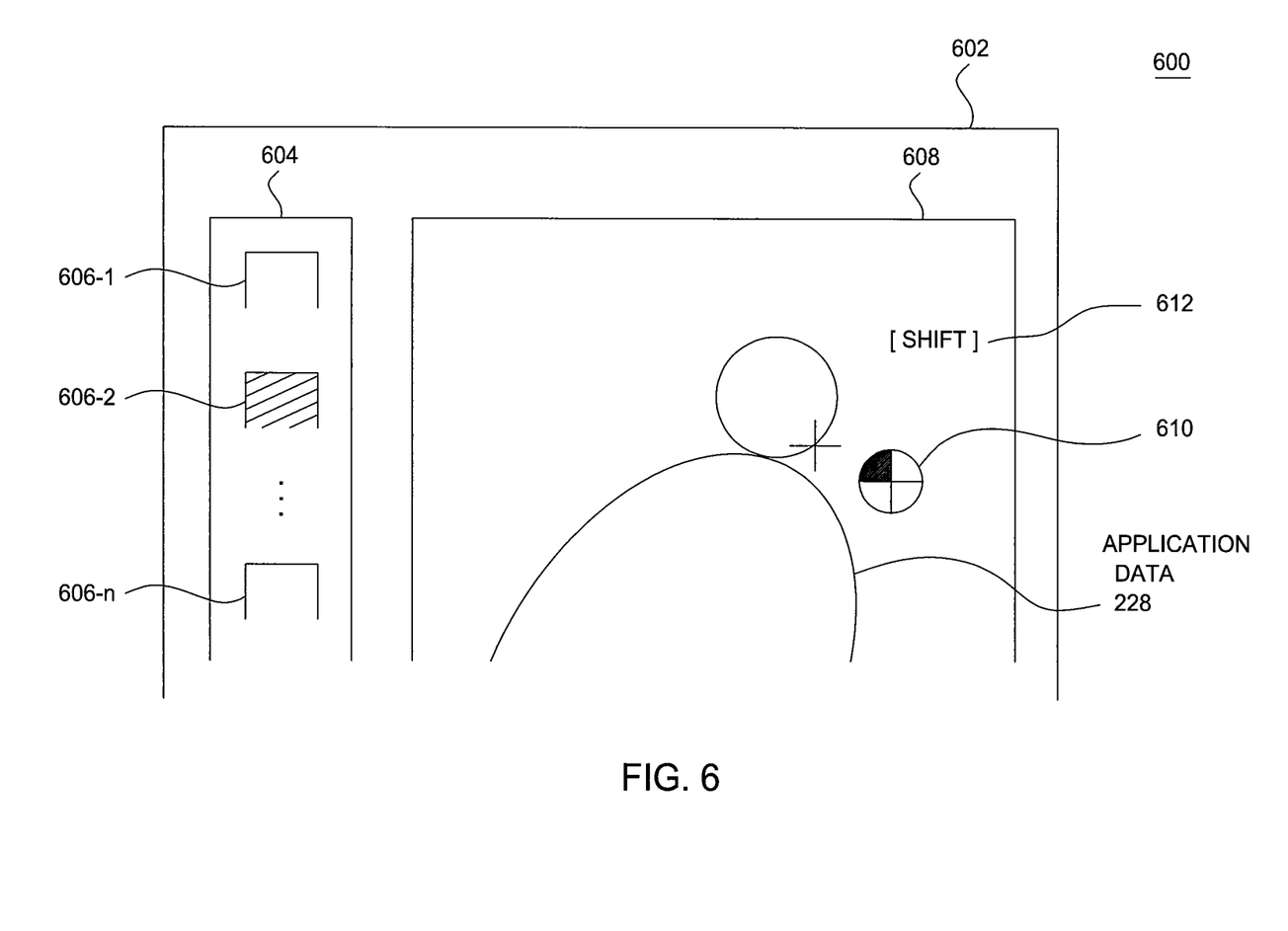

FIG. 6 illustrates a screenshot 602 of a GUI, according to one embodiment of the invention. As shown, the screenshot 602 includes a viewing area 608, a toolbar 604, and one or more tool icons 606. Viewing area 608 displays a video clip that illustrates modifications made to application data 228 using a specific tool. In the exemplary illustration of FIG. 6, the modifications are made to application data 228 using the tool corresponding to tool icon 606. When the end-user selects one of the thumbnail images shown in FIGS. 5A and 5B, the user operations engine 212 causes viewing area 608 to display a video clip that demonstrates modifications made to the selected region of application data 228. User operations engine 212 also causes viewing area 608 to display a mouse icon 610 and a keystroke indicator 612 that indicate mouse position and mouse clicks, as well as keystrokes, respectively.

Figure 7A:
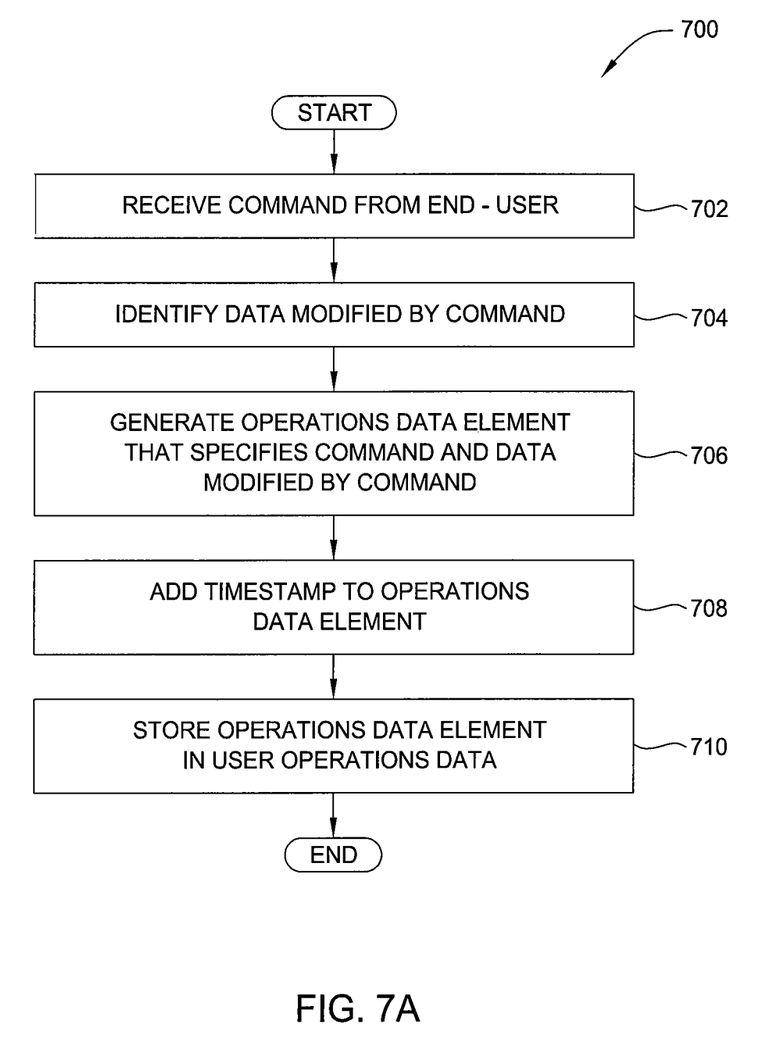
FIGS. 7A-7B are flowcharts of method steps for generating user operations data, according to one embodiment of the invention.

FIG. 7A is a flowchart of method steps for generating user operations data 214, according to one embodiment of the invention. Although the method steps are described in conjunction with the system of FIGS. 1-2, persons skilled in the art will understand that any system configured to perform the method steps, in any order, is within the scope of the invention.

As shown, the method 700 begins at step 702, where the user operations engine 212 receives a command from an end-user of the endpoint machine 102. At step 704, the user operations engine 212 identifies a region of application data 228 modified by the command. At step 706, the user operations engine 212 generates an operations data element 302 that specifies the command 304 and the modifications 306 to the data. At step 708, the user operations engine 212 adds a timestamp 308 to the operations data element 302. At step 710, the user operations engine 212 stores the operations data element 302 in the user operations data 214. The method 700 then ends.

Figure 7B:
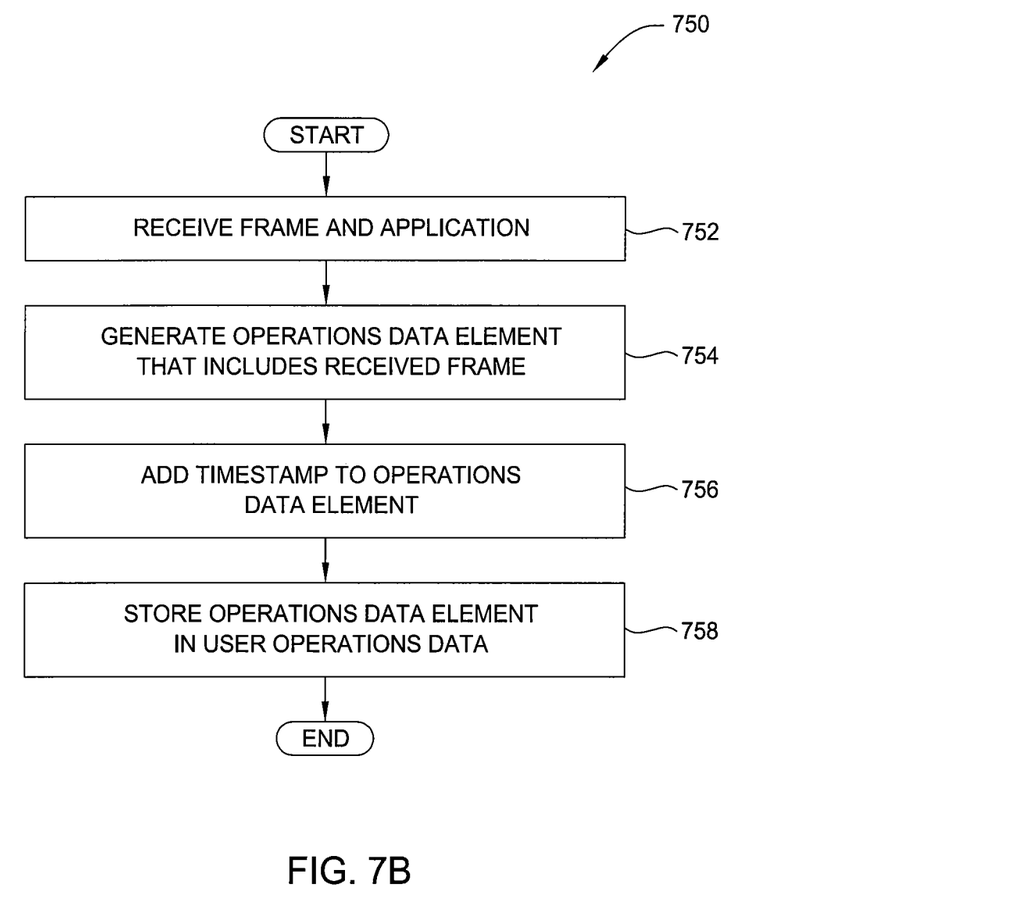

FIG. 7B illustrates an alternative to the method 700 described above, according to another embodiment of the invention. Although the method steps are described in conjunction with the system of FIGS. 1-2, persons skilled in the art will understand that any system configured to perform the method steps, in any order, is within the scope of the invention.

As shown, the method 750 begins at step 752, where the user operations engine 212 receives a frame from the application 210. At step 754, the user operations engine 212 generates an operations data element 310 that includes a received frame 312. At step 756, the user operations engine 212 adds a timestamp 314 to the operations data element 310. In one embodiment, the user operations engine 212 also includes within the operations data element 310 data that identifies the video clip with the particular region of the application data 228 currently being modified. At step 758, the user operations engine 212 stores the operations data element 310 in the user operations data 214. The method 750 then ends.

Figure 8:
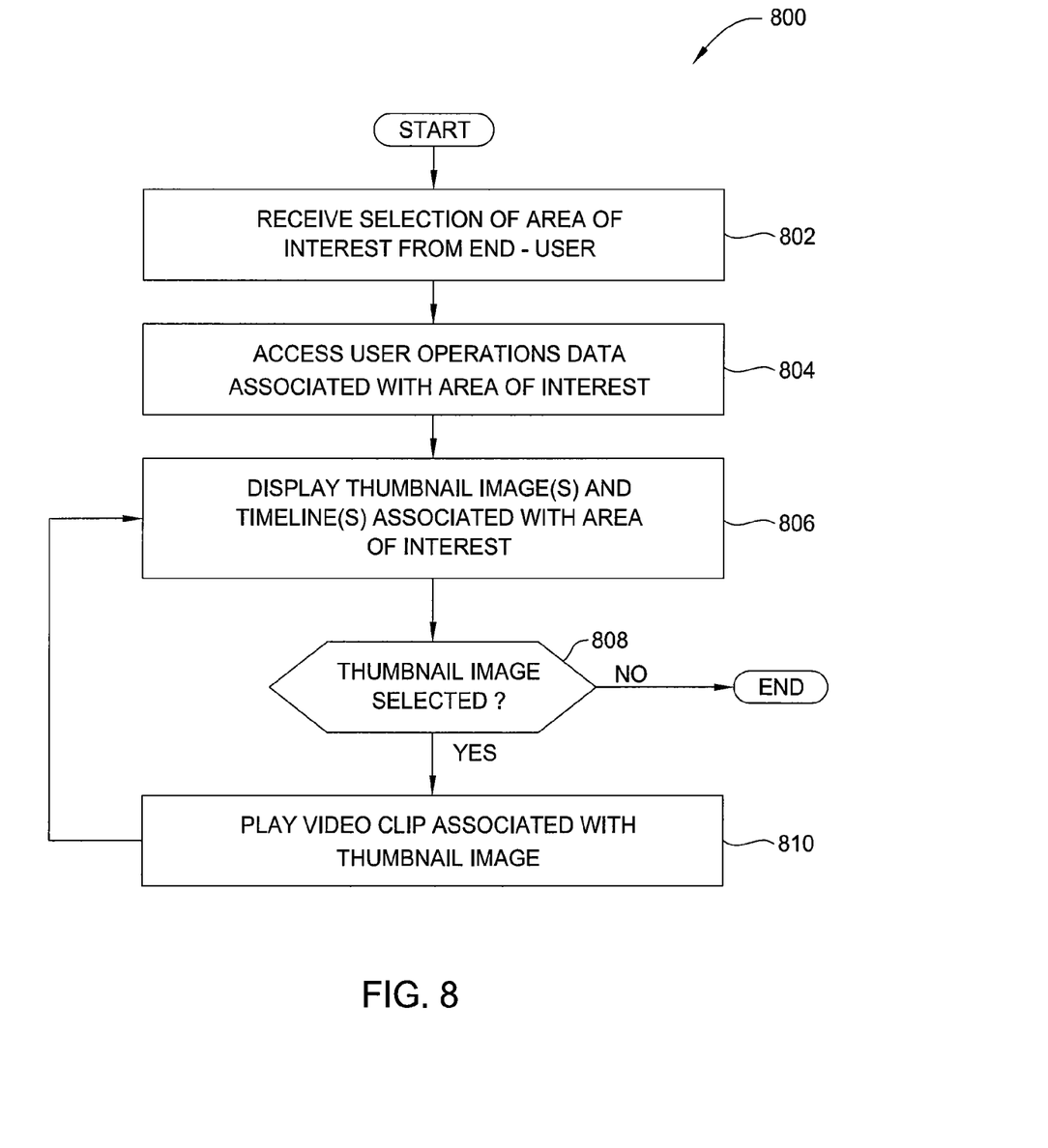
FIG. 8 is a flowchart of method steps for providing to an end-user instructional information pertaining to a specific feature of a computer-aided design (CAD) drawing, according to one embodiment of the invention.

FIG. 8 is a flowchart of method steps for providing to an end-user instructional information pertaining to a specific feature of a computer-aided design (CAD) drawing, according to one embodiment of the invention. Although the method steps are described in conjunction with the system of FIGS. 1-2, persons skilled in the art will understand that any system configured to perform the method steps, in any order, is within the scope of the invention.

As shown, the method 800 starts at step 802, where the user operations engine 212 receives a selection of an area of interest from the end-user via the selection marquee 404. At step 804, the user operations engine 212 accesses user operations data associated with the area of interest. The user operations engine 212 may retrieve the user operations data from the operations database 226 within the server machine 216 or, alternatively, retrieve the operations data 214 from within the endpoint machine 102. At step 806, the user operations engine 212 displays one or more thumbnail images and a timeline associated with the area of interest selected using the selection marquee 404. The thumbnail images could be any of the thumbnail images illustrated in FIGS. 5A-5B. At step 808, the user operations engine 212 determines whether a selection of a thumbnail image was received from the end-user. If a selection of a thumbnail image was not received from the end-user, then the method 800 ends. If a selection of a thumbnail image was received by the user operations engine 212, then the method proceeds to step 810. At step 810, the user operations engine 212 causes a video clip associated with the thumbnail image to be displayed. The method 800 then returns to step 806 and proceeds as described above.

In sum, a user operations engine records commands issued by an end-user to a software application and data specifying regions of a document modified by those commands. The recorded data is uploaded to a server. The user operations engine may also receive from the end-user a selection of a particular region of a document associated with the software application. The user operations engine retrieves from the server video clips that demonstrate different modifications being made to the particular region using various tools associated with the software application.

One advantage of the techniques described herein is that the end-user of a CAD application is provided with instructional information specifying a precise sequence of operations that can be implemented to generate and/or modify a particular feature of a CAD drawing.

Although the method steps are described in conjunction with the system of FIG. 1, persons skilled in the art will understand that any system configured to perform the method steps, in any order, is within the scope of the invention.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed:

1. A computer-implemented method for providing data-related instructional information to an end-user of a software application executing on a computing device, the method comprising:

receiving a selection of a first region of application data associated with the software application on the computing device, the first region comprising a portion of the application data;

accessing instructional information indicating how to use one or more techniques and/or tools previously used to modify the first region; and displaying the instructional information to the end-user via a display associated with the computing device by generating a hierarchical timeline of images, wherein a first level of the hierarchical timeline includes a first sequence of two or more thumbnail images that represents a first modification made to the first region over time, and a second level of the hierarchical timeline includes a second sequence of two or more thumbnail images that represents a portion of the first modification made to the first region over time.

2. The method of claim 1, wherein the instructional information comprises at least one video clip that illustrates how to use the one or more techniques and/or tools to modify the first region.

3. The method of claim 2, wherein the step of displaying the instructional information further comprises:

displaying at least one thumbnail image that corresponds to the at least one video clip;

receiving a selection of the at least one thumbnail image; and displaying the at least one video clip in response to receiving the selection of the at least one thumbnail image.

4. The method of claim 2, wherein the instructional information is generated by:

recording a video clip of a sequence of images displayed on the display during a first time span during which the first region is being modified;

generating an operations data element that includes the video clip, an indication of the first region, and a timestamp that reflects the first time span; and storing the operations data element in an operations database, wherein the instructional information is derived from the operations data element.

5. The method of claim 1, wherein the instructional information is distributed across one or more databases.

6. The method of claim 1, wherein the software application comprises a computer-aided design application.

7. The computer-implemented method of claim 1, wherein the instructional information includes a sequence of commands previously executed to modify the first region of application data.

8. The computer implemented method of claim 7, wherein the instructional information is generated by:

receiving a plurality of commands, each command associated with an operation that modifies the first region during a first time span;

generating an operations data element that includes the plurality of commands for producing a plurality of modifications to the first region, an indication of the first region, and a timestamp that reflects the first time span; and storing the operations data element in an operations database, wherein the instructional information is derived from the operations data element.

9. The computer-implemented method of claim 8, wherein each thumbnail image in the plurality of thumbnail images corresponds to a different modification in the plurality of modifications.

10. A computer-readable medium including instructions that, when executed by a processing unit within a computing device, cause the processing unit to provide data-related instructional information to an end-user of a software application executing on the computing device, by performing the steps of:

receiving a selection of a first region of application data associated with the software application on the computing device, the first region comprising a portion of the application data;

accessing instructional information indicating how to use one or more techniques and/or tools previously used to modify the first region; and displaying the instructional information to the end-user via a display associated with the computing device by generating a hierarchical timeline of images, wherein a first level of the hierarchical timeline includes a first sequence of two or more thumbnail images that represents a first modification made to the first region over time, and a second level of the hierarchical timeline includes a second sequence of two or more thumbnail images that represents a portion of the first modification made to the first region over time.

11. The computer-readable medium of claim 10, wherein the instructional information comprises at least one video clip that illustrates how to use the one or more techniques and/or tools to modify the first region.

12. The computer-readable medium of claim 11, wherein the step of displaying the instructional information further comprises:

displaying at least one thumbnail image that corresponds to the at least one video clip;

receiving a selection of the at least one thumbnail image; and displaying the at least one video clip in response to receiving the selection of the at least one thumbnail image.

13. The computer-readable medium of claim 11, wherein the instructional information is generated by:

recording a video clip of a sequence of images displayed on the display during a first time span during which the first region is being modified;

generating an operations data element that includes the video clip, an indication of the first region, and a timestamp that reflects the first time span; and storing the operations data element in an operations database, wherein the instructional information is derived from the operations data element.

14. The computer-readable medium of claim 10, wherein the instructional information is distributed across one or more databases.

15. The computer-readable medium of claim 10, wherein the software application comprises a computer-aided design application.

16. A computing device configured to provide data-related instructional information to an end-user of a software application executing on the computing device, the computing device comprising:
a processing unit configured to:
receive a selection of a first region of application data associated with the software application on the computing device, the first region comprising a portion of the application data;
access instructional information indicating how to use one or more techniques and/or tools previously used to modify the first region;
display the instructional information to the end-user via a display associated with the computing device by generating a hierarchical timeline of images,
wherein a first level of the hierarchical timeline includes a first sequence of two or more thumbnail images that represents a first modification made to the first region over time, and a second level of the hierarchical timeline includes a second sequence of two or more thumbnail images that represents a portion of the first modification made to the first region over time.

17. The computing device of claim 16, wherein the processing unit is further configured to:
record a video clip of a sequence of images displayed on the display during a first time span during which the first region is being modified;
generate an operations data element that includes the video clip, an indication of the first region, and a timestamp that reflects the first time span; and
store the operations data element in an operations database, wherein the instructional information is derived from the operations data element.

18. The computing device of claim 16, wherein the instructional information is distributed across one or more databases.

* * * * *